United States Patent
Busch (10) Patent No.: US 7,401,009 B2
(45) Date of Patent: Jul. 15, 2008

(54) MAGNETOSTATIC MODELING METHODS AND SYSTEMS FOR USE WITH BOUNDARY ELEMENT MODELING

(75) Inventor: Nicholas F. Busch, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 778 days.

(21) Appl. No.: 10/184,677

(22) Filed: Jun. 26, 2002

(65) Prior Publication Data

US 2004/0002840 A1    Jan. 1, 2004

(51) Int. Cl.
G06F 7/60 (2006.01)
G06G 7/56 (2006.01)
G06G 7/48 (2006.01)
G06F 17/50 (2006.01)

(52) U.S. Cl. .................. 703/2; 703/5; 703/6; 716/4
(58) Field of Classification Search ............ 703/2, 703/5, 6; 716/4
See application file for complete search history.

(56) References Cited

U.S. PATENT DOCUMENTS

| | | | |
|---|---|---|---|
| 5,554,265 A | 9/1996 | Bonyhard et al. | 204/192.35 |
| 5,596,272 A | 1/1997 | Busch | 324/207.21 |
| 5,614,821 A | 3/1997 | Leiderer | 324/174 |
| 5,712,565 A | 1/1998 | Schultz et al. | 324/252 |
| 5,729,128 A | 3/1998 | Bunyer et al. | 324/202 |
| 5,776,537 A | 7/1998 | Ryan et al. | 427/8 |
| 5,796,249 A | 8/1998 | Andra et al. | 324/207.21 |
| 6,529,140 B1 | 3/2003 | Sax et al. | 340/870.33 |
| 2002/0173941 A1* | 11/2002 | Hines et al. | 703/13 |
| 2003/0184284 A1* | 10/2003 | Chadebec et al. | 324/200 |

OTHER PUBLICATIONS

Y. Bulent Yildir, et al. Three Dimensional Analysis of Magnetic Fields Using the Boundary Element Method, Integrated Engineering Software, Oct. 7-10, 1991 EEIC/ICWA conference.*
B. Krstajic et al. NonLinear 3D Magnetostatic Field Calculation by the Integral Equation Method with Surface and Volume Mangetic Charges, Mar. 1992, IEEE Transactions on Magnetics, vol. 28, No. 2,pp. 1088-1091.*
W.M. Rucker et al. Boundary Element Analysis of 3-D Magnetostatic Problems using Scalar Potentials, Mar. 1992, IEEE Transactions on Magnetics, vol. 28, No. 2,pp. 1099-1102.*
Yu. A. Bakhavalov et al., Finite-and Boundary-Element Modeling of Steady Magnetic Fields of Magnetoelectric Systems, 1999, Elektrotekhnika, Russian Electrical Engineering, vol. 70, No. 1, pp. 37-42.*

(Continued)

*Primary Examiner*—Kamini Shah
*Assistant Examiner*—David Silver
(74) *Attorney, Agent, or Firm*—Kermit D. Lopez; Luis M. Ortiz (57) ABSTRACT

Methods and systems for magnetostatic modeling of a magnetic object is disclosed. A varying surface charge density is established at a surface of a magnetic object modeled by a magnetostatic model. Thereafter, a varying magnetic charge is generally distributed throughout a volume of the magnetic object to thereby accurately and efficiently model the magnetic object across a wide range of magnetic curves utilizing the magnetostatic model. The magnetic curves can be configured to generally comprise at least one non-linear magnetic curve and/or least one linear magnetic curve. Such magnetic curves may also comprise at least one magnetic curve in a magnetized direction and/or non-magnetized direction. Such magnetic curves are generally referred to as "BH curves".

27 Claims, 5 Drawing Sheets

OTHER PUBLICATIONS

Anasoft Maxwell 3D Brochure, http://web.archive.org/web/20010208084547/http://www.ansoft.com/products/em/pdfs/ansoft_Maxwell3D2.pdf, Feb. 8, 2001.*

Ansys Emag, Electromangetic Simulation Software, http://web.archive.org/web/20010302042047/http://www.ansys.com/products/html/emag.htm.*

Lin Han et al. Integral Equation Method Using Total Scalar Potential for the Simulation of Linear or Nonlinear 3D Magnetostatic Field with Open Boundary, Sep. 1994, IEEE Transaction on Magnetics, vol. 30 No. 5, pp. 2897-2900.*

S. Anthony, Phenomenology of Gerromagnetism: I. Effects of Mangetostatics on Suscpetibility, Nov. 1989,IEEE Transaction on Magnetics, vol. 25 No. 6, pp 4364-4373.*

J. Fetzer, Application of BEM-FEM Coupling and the Vector Preisach Model for the Calculation of 3D Magnetic Fields in Media with Hysteresis, Jul. 2000, IEEE Transaction on Magnetics, vol. 36 No. 4, pp. 1258-1262.*

S. Mandayam, Monte Carlo Methods for Modeling Magnetostatic NDE Phonemena: A Feasibility Study, May 1996, IEEE Transaction on Magnetics, vol. 32 No. 3, pp 1425-1428.*

Ozaki et al, "Surface magnetic charge distribution of a long, thin cylinder and its edge singularity", Publication Date: Jul. 1998 vol. 34, Issue: 4 , Part 2 On pp. 2185-2191.*

Kobayashi et al, "Surface magnetic charge distributions and demagnetizing factors of circular cylinders" This paper appears in: Magnetics, IEEE Transactions on Publication Date: May 1992 vol. 28 , Issue: 3 On pp. 1810-1814.*

Bretchko et al, "Open-loop pulsed hysteresis graph system for the magnetization of rare-earth magnets" Magnetics, IEEE Transactions on vol. 36, Issue 4, Part 2, Jul. 2000 pp. 2042-2051.*

Kem Robinson, LBNL May 17, 2001, Stanford, http://www-project.slac.stanford.edu/lc/local/MAC/MAY2001/Talks/MAC%20Robinson.PDF, 2001.*

Ozaki et al, "Surface magnetic charge distribution of a long, thin cylinder and its edge singularity", Publication Date: Jul. 1998 vol. 34, Issue: 4 , Part 2 On pp. 2185-2191.*

Kem Robinson, LBNL May 17, 2001, Stanford, http://www-project.slac.stanford.edu/lc/local/MAC/MAY2001/Talks/MAC%20May%20Robinson.PDF, 2001.*

Canova, A.; Vusini, B., "Design of axial eddy current couplers," Industry Applications Conference, 2002. 37th IAS Annual Meeting. Conference Record of the , vol. 3, no., pp. 1914-1921 vol. 3, 2002.*

* cited by examiner

MAGNETOSTATIC MODELING METHODS AND SYSTEMS FOR USE WITH BOUNDARY ELEMENT MODELING

TECHNICAL FIELD

The present invention is generally related to magnetostatic modeling methods and systems. The present invention is also related to methods and systems for modeling magnetic and ferrous objects. The present invention is additionally related to boundary element modeling methods and systems.

BACKGROUND OF THE INVENTION

The energy present in a magnetostatic structure has been used in a wide range of applications, including magnetic sensors utilized in a variety of technical and commercial applications, including in particular, automotive applications. The generation of a voltage in a conductor by the changing of a magnetostatic structure or the movement of a magnetostatic structure relative to the conductor is a well-known concept. The aforementioned conductors commonly use a permanent magnet made of electrically conducting metal.

In the development of magnetic sensors, it is often necessary to create various types of magnetic sensor data processing algorithms and systems capable of localizing, quantifying, and classifying such objects based on their magnetostatic fields. In general, a magnetostatic field may be generated by any combination of three physical phenomena: permanent or remanent magnetization, magnetostatic induction, and electromagnetic induction. The first phenomena can occur in objects that contain metals of the ferromagnetic group, which includes iron, nickel, cobalt, and their alloys. These may be permanently magnetized either through manufacture or use. Second, fields external to the object may induce a secondary field in ferromagnetic structures and also paramagnetic structures if the mass and shape sufficiently enhance the susceptibility. Third, the object may comprise a large direct current loop that induces its own magnetic field.

Many of the current magnetostatic modeling methods applicable to magnetic sensor development rely upon boundary element modeling software. Such software generally utilizes both direct and indirect boundary element methods as well as finite element methods to accurately model magnetic properties of various structures/solids and their interaction with surrounding components. The boundary element method has become an important technique in the computational solution of a number of physical problems. In common with the better-known finite element method and finite difference method, the boundary element method is essentially a mathematical and algorithmic technique that can be utilized to solve partial differential equations. Boundary element techniques generally have earned the important distinction that only the boundary of the domain of interest requires discretisation. For example, if the domain is either the interior or exterior to a sphere, then the resulting diagram will depict a typical mesh, and only the surface is generally divided into elements. Thus, the computational advantages of the boundary element technique over other methods can be considerable, particularly in magnetic modeling applications.

One particular modeling software and its associated algorithms and software modules that have been utilized by the present inventor at Honeywell is referred to collectively as "Narfmm". Such magnet models generally have always assumed a relative permeability (i.e., $\mu$ in units of Gauss/Oersted) equal to one. This assumption results in magnet models with "magnetic charge" residing only on the surface of the magnet. This is a good approximation for magnet materials such as sintered SmCo and NdFeB that have $\mu$ between 1 and 1.1. For magnet materials, however, with a greater $\mu$, such as NdFeB powder in plastic with $\mu$ equal to 1.3, assuming $\mu$ equal to one, large errors typically can result. Also for nonlinear BH curve materials, such as AlNiCo, magnetostatic models such as Narfmm models can result in a substantial error. For ferrous objects, magnetostatic models such as Narfmm generally assume infinite permeability, which forces the "magnetic charge" to reside only on the surface of the ferrous object. If this is not a good assumption, software models such as Narfmm models have been inadequate.

Based on the foregoing, the present inventor has concluded that a more accurate model for magnets and ferrous objects should have a varying surface charge density at the magnetic object surface and also a varying magnetic charge distributed throughout the volume of the magnetic object. The present invention thus improves modeling accuracy by describing a method for modeling magnets and ferrous objects, which have any defined BH curve within modeling methods, such as, for example, the Narfmm software, thereby eliminating prior art limitations.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide a method and system for accurately and efficiently modeling a magnetic object.

It is another aspect of the present invention to provide a method and system for accurately and efficiently modeling a ferrous object.

It is yet another aspect of the present invention to provide an improved magnetostatic modeling method and system.

It is still another aspect of the present invention to provide an improved magnetostatic modeling method and system for use with boundary element modeling.

Methods and systems for magnetostatic modeling of a magnetic object are disclosed herein. A varying surface charge density is established at a surface of a magnetic object modeled by a magnetostatic model. Thereafter, a varying magnetic charge is generally distributed throughout a volume of the magnetic object to thereby accurately and efficiently model the magnetic object across a wide range of magnetic curves utilizing the magnetostatic model. The magnetic curves can be configured to generally comprise at least one non-linear magnetic curve and/or at least one linear magnetic curve. Such magnetic curves may also comprise at least one magnetic curve in a magnetized direction and/or non-magnetized direction. Such magnetic curves are generally referred to herein as "BH curves".

The magnetostatic model may be created using a magnetostatic-modeling module (e.g., software) such as, for example, boundary element-modeling module software. The magnetic object to be modeled can be a magnet or another ferrous object. The magnetic object to be modeled can also be an anisotropic magnet. The magnetostatic modeling methods and systems described herein can be applied to magnets with a large $\mu$, such as NdFeB-based magnets and non-linear BH curve materials such as AlNiCo, or to any value of $\mu$. The present invention thus discloses a method and system for accurately and efficiently modeling magnets and ferrous objects, which have any defined BH curve with a magnetostatic model such as can be derived from magnetostatic-modeling software.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

Figure 1:
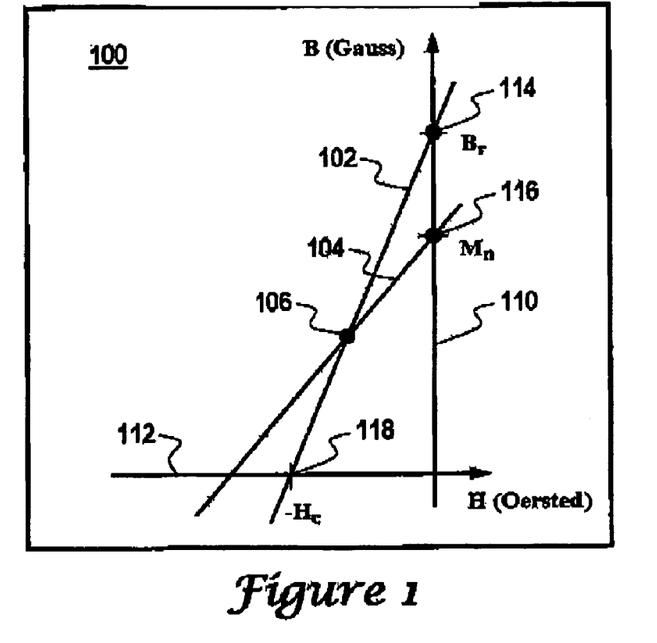
FIG. 1 depicts a graph illustrating a BH curve of a magnet and BH curve of magnet elements, in accordance with a preferred embodiment of the present invention.

FIG. 1 illustrates a graph 100 illustrating a BH curve 102 of a magnet and BH curve 104 of magnet elements, in accordance with a preferred embodiment of the present invention. BH curve 102 is a BH curve of a magnet to be modeled, according to Eq. (1) $B = \alpha \cdot H + B_r$ wherein $\alpha = B_r/H_c$. BH curve 104 represents a BH curve for an $n^{th}$ magnet element based on the formulation of $B = H + M_n$ such that an intersection point 106 exists between BH curve 102 and BH curve 104. The intersection point 106 is equal to $(B_n, H_n)$, wherein $B_n$ represents the magnetic flux density at the $n^{th}$ magnet element (Gauss), and $H_n$ represents the magnetic field intensity at the $n^{th}$ magnet element (Oersted). BH curve 102 generally crosses axis 110 at point 114 (i.e., $B_r$), and the axis 112 at point 118 (i.e., $-H_c$). BH curve 104 crosses axis 110 at point 116 (i.e., $M_n$). In general, the magnet to be modeled has a BH curve 102 as shown in FIG. 1 and Equation (1).

$$B = \alpha \cdot H + B_r \quad (1)$$

In general, B represents the magnetic flux density (Gauss); $\alpha$ represents the slope of the line and also the µ of the magnet (Gauss/Oersted); H represents the magnetic field intensity (Oersted); and $B_r$ represents the residual induction (Gauss). $H_c$ represents the coercive force (Oersted). In this model the µ variable is generally equal to the $\alpha$ variable only in the magnetized direction. The variable µ in the non-magnetized direction is equal to unity.

The magnet volume is generally divided into volume elements. Each $n^{th}$ volume element is itself a magnet that will be modeled with a standard magnet model such as Narfmm with a BH curve shown 104 in FIG. 1 and equation (2).

$$B = H + M_n \quad (2)$$

Note that although the present invention is discussed and illustrated herein with respect to a standard magnetostatic modeling software package such as Narfmm, those skilled in the art can appreciate that such a magnetostatic modeling mechanism or module is not a limiting feature of the present invention but represents an illustrative example only of one modeling system to which the present invention may apply. Narfmm is thus presented herein for general illustrative and edification purposes only, and other modeling software packages or methodologies can be employed.

With respect to Equation (2), B represents the magnetic flux density (Gauss); H represents the magnetic field intensity (Oersted); and $M_n$ represents the residual induction of the $n^{th}$ magnet element (Gauss).

In order to model the magnet, the value of $M_n$ for each $n^{th}$ volume element is determined. Each magnet element will lie somewhere on the actual BH curve line 102 shown in FIG. 1 with respect to Equation (1). The magnet element can be modeled with the µ equal to one BH curve as determined in Equation (2) if the proper $M_n$ can be determined. If the intersection point 106 $(B_n, H_n)$ is known, $M_n$ can be determined as shown in Equation (3), since the slope is equal to one.

$$M_n = B_n - H_n \quad (3)$$

With respect to Equation (3), once all of the $M_n$ results are known, a standard Narfmm magnet model (i.e., modeling software) can be used for each magnet element, summing all of the magnet elements' contributions through superposition to obtain the magnetic field from the whole magnet. The standard Narfmm magnet model refers to a magnet model wherein the magnetic charge resides completely on the surface of the magnet element, which is easier to model in comparison to a distribution throughout the volume.

The defining relation for the flux density inside a magnet with µ equal to one is:

$$B = \mu \cdot H + M + B_e \quad (4)$$

With respect to Equation (4), B represents the magnetic flux density (Gauss); µ represents the relative permeability, which is equal to one (Gauss/Oersted); H represents the magnetic field strength (Oersted); M represents the residual magnetic induction (Gauss); and $B_e$ represents the magnetic flux density from sources external to the magnet (Gauss).

For the $n^{th}$ magnet volume element, using Equation (4) and replacing µ with 1, Equation (5) results as indicated below.

$$B_n = H_n + M_n + B_{en} \quad (5)$$

With respect to Equation (5), $B_{en}$ represents the magnetic flux density in the magnetized direction on magnet element n from the other magnet sources external to the magnet element (Gauss). Note that the center of the magnet volume element is used as the field point to determine the BH curve's intersection point in all equations. The larger the number of magnet elements, the smaller the element size, and the smaller the error associated with subdividing the magnet into a finite number of sections. Any arbitrary level of accuracy can be obtained by increasing the number of magnet elements to the proper level.

Additionally, $H_n$ can be expressed in normalized terms as indicated in Equation (6) below.

$$H_n = M_n \cdot H_{Nn} \tag{6}$$

With respect to Equation (6), $H_{Nn}$ generally represents the normalized H in the magnetized direction at the center of the $n^{th}$ magnet element (Oersted/Gauss).

$H_{Nn}$ is calculated with the standard Narfmm magnet equations by letting the residual induction be equal to unity.

$$B_{en} = \sum_{\substack{m=1 \\ m \neq n}}^{P} M_m \cdot B_{Nmn} \tag{7}$$

With respect to Equation (7), P represents the total number of magnet elements; and $B_{Nmn}$ represents the normalized magnetic flux density from magnet element m to magnet element n in the magnetized direction (unitless). $B_{Nmn}$ is calculated with the standard Narfmm magnet equations by letting the residual induction of magnet element m be equal to unity. Thus, substituting Equation (6) and Equation (7) into Equation (5) yields the formulation of Equation (8), as indicated below.

$$B_n = M_n \cdot H_{Nn} + M_n + \sum_{\substack{m=1 \\ m \neq n}}^{P} M_m \cdot B_{Nmn} \tag{8}$$

Combining Equation (1) and Equation (2) to determine the intersection point of the two BH curve lines, and solving for $B_n$ yields the following Equation (9).

$$B_n = \frac{B_r - \alpha \cdot M_n}{(1 - \alpha)} \tag{9}$$

Combining Equation (8) and Equation (9) to eliminate $B_n$ yields Equation (10).

$$\frac{B_r - \alpha M_n}{(1 - \alpha)} = M_n \cdot H_{Nn} + M_n + \sum_{\substack{m=1 \\ m \neq n}}^{P} M_m \cdot B_{Nmn} \tag{10}$$

In Equation (10) there are P equations with P unknowns. The P unknowns are $M_n$. A linear set of equations results from Equation (10) that can be transformed into matrix form as shown in Equation (11).

$$\Psi \times \Phi = \Gamma \tag{11}$$

With respect to Equation (11), $\psi$ represents a P×P matrix of known values. $\phi$ represents a P×1 matrix, with elements $M_1$ through $M_p$. $\Gamma$ represents a P×1 matrix of known values.

To solve for the variable $M_n$ for use in the magnet model, a solution for $\phi$ is achieved, as illustrated in Equation (12) below.

$$\Phi = \Psi^{-1} \times \Gamma \tag{12}$$

The diagonal elements of $\psi$ are provided in Equation (13).

$$\Psi_{nn} = H_{Nn} + 1 + \frac{\alpha}{1 - \alpha} \tag{13}$$

The off diagonal elements of $\psi$ are provided in Equation (14).

$$\Psi_{nm} = B_{Nmn} \text{ for } m \neq n \tag{14}$$

In Equation (13) and Equation (14), the subscript index on $\psi$ indicates the row and column number of the matrix respectively. Each element of $\Gamma$ is the same and is provided in Equation (15).

$$\Gamma_n = \frac{B_r}{1 - \alpha} \tag{15}$$

FIG. 1 thus generally illustrates and describes a method that can be utilized to model magnets with a constant μ greater than one in modeling software, such as, for example, Narfmm. Those skilled in the art can appreciate that the Narfmm software discussed herein is not a limiting feature of the present invention. Such software is only described herein in the context of a representative embodiment in which the present invention may preferably be embodied. Those skilled in the art will appreciate, however, that the methodology described herein is applicable to a wide variety of modeling software applications.

This aforementioned modeling methodology can be utilized to model block magnets, but it can be adapted for use with any magnet of any shape or size. Also, such a methodology allows μ greater than one only in the magnetized direction. Off the magnetization axis, μ is one. However the same principles can apply in order to create a model with μ greater than one in the other two orthogonal directions. With respect to the implementation described with respect to FIG. 1, the volume magnetic charges are represented by rectangles of constant charge density. To decrease computation time, the volume poles can be represented with point charges for most applications. This methodology can be adapted to more complex BH curves, such as AlNiCo magnets, which have BH curves that can be closely approximated with a second order polynomial such as indicated in Equation (16) below.

$$B = \beta \cdot H^2 + \alpha \cdot H + B_r \tag{16}$$

The same basic approach discussed above can be utilized to set up the P equations and P unknowns by replacing Equation (1) with Equation (16). However, the solution cannot be placed into the form of Equation (12), so another mathematical or numeric method is required to solve for M in that case. Magnets having BH curves such as those resulting from Equation (16) can be addressed using the methodology following Equation (32).

Figure 2:
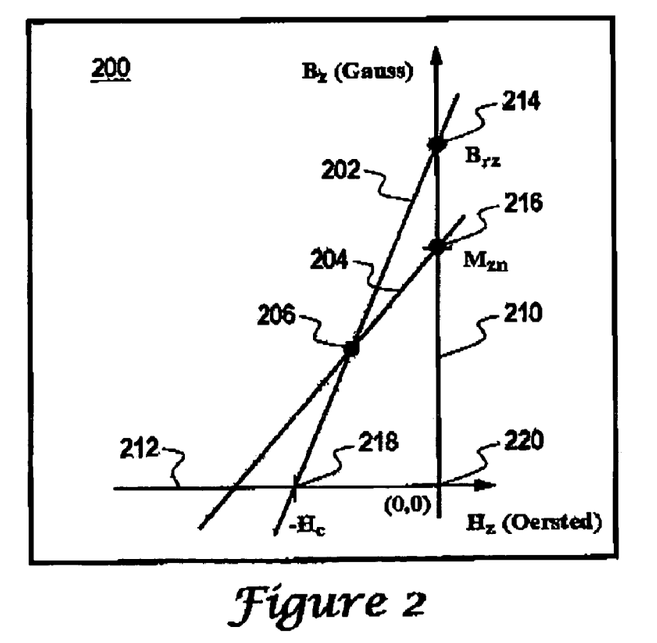
FIG. 2 depicts a graph illustrating a BH curve of a magnet and a BH curve of magnet elements in a magnetized Z-direction, in accordance with a preferred embodiment of the present invention.

FIG. 2 depicts a graph 200 depicting a BH curve 202 of a magnet and a BH curve 204 of magnet elements in a magnetized Z-direction, in accordance with a preferred embodiment of the present invention. Graph 200 also includes an axis 210 and an axis 212. BH curve 202 represents the actual BH curve in the magnetized Z-direction of a magnet to be modeled. BH curve 202 is modeled according to the formulation $B=\alpha_z \cdot H_z + B_{rz}$ wherein $\alpha_z = B_r/H_c$. BH curve 204 represents a BH curve for an $n^{th}$ magnet element in the Z-direction based on the formulation of $B_z = H_z + Mz_n$ such that an intersection point 206 (i.e., $B_{zn}, H_{zn}$) exists between BH curve 102 and BH curve 104. BH curve 202 crosses axis 210 at point 214 (i.e., $B_{rz}$) and axis 212 at point 218 (i.e., $-H_c$). BH curve 204 crosses axis 210 at point 216 (i.e., $M_{zn}$). Point 220 represents originating coordinates (0,0) of graph 200.

Figure 3:
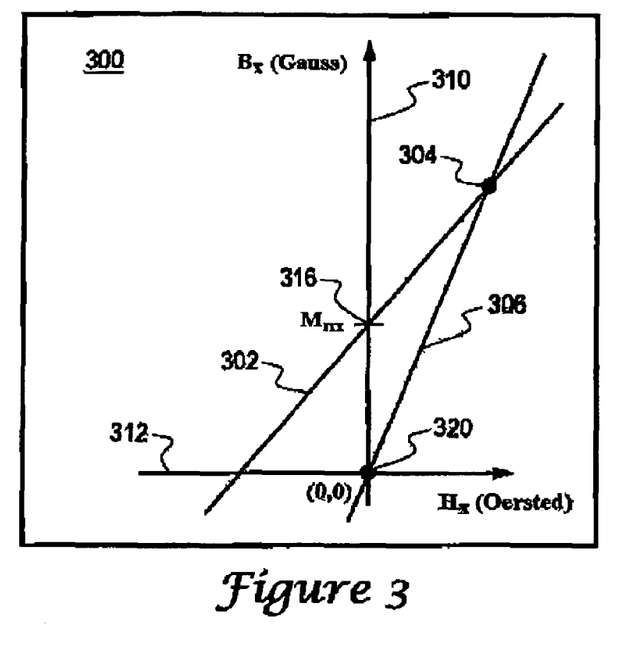
FIG. 3 depicts a graph illustrating a BH curve of a magnet and a BH curve of magnet elements in a non-magnetized direction, in accordance with a preferred embodiment of the present invention.

FIG. 3 illustrates a graph 300 illustrating a BH curve 306 of a magnet and a BH curve 302 of magnet elements in a non-magnetized direction, in accordance with a preferred embodiment of the present invention. Graph 300 includes an axis 310 and an axis 312 and originating point 320 with coordinates of (0,0). According to graph 300, $B_{rx}=0$, as shown at point 320. BH curve 302 represents a BH curve for the $n^{th}$ magnet element in the X direction, wherein $B_x = H_x + M_n$. BH curve 306, on the other hand, represents the actual BH curve of the magnet to be modeled in a non-magnetized X direction, wherein $B_x = \alpha_x \times H_x$. An intersection point 304 exists between BH curve 302 and BH curve 306 wherein the intersection point is equal to ($B_{nx}, H_{nx}$). BH curve 302 crosses axis 310 at point 316, while BH curve 304 crosses point 320.

As indicated earlier, a method for modeling a magnet with permeability ($\mu$) greater than one in the magnetized direction within modeling software can be implemented in accordance with the methodology of the present invention. FIGS. 2 and 3 expand on that method by describing a method for modeling a magnet with $\mu$ greater than one in both the magnetized and non-magnetized directions. The magnet to be modeled thus has BH curves 202 and 306 as respectively illustrated in FIGS. 2 and 3 and additionally described with respect to Equation (17) below. Thus, assume the magnet is magnetized in the z direction.

$$B_x = \alpha_x \cdot H_x$$

$$B_y = \alpha_y \cdot H_y$$

$$B_z = \alpha_z \cdot H_z + B_{rz} \quad (17)$$

The x, y and z subscripts indicated in Equation (17) above generally denote spatial direction. B represents the magnetic flux density (Gauss). Additionally, $\alpha$ represents the slope of the line, and also the $\mu$ of the magnet (Gauss/Oersted). H represents the magnetic field intensity (Oersted), and $B_r$ represents the residual induction (Gauss).

The magnet volume is divided into volume elements. Each $n^{th}$ volume element is itself a magnet that will be modeled with a standard magnet model (e.g., Narfmm) having BH curves 202 and 306 as respectively illustrated in FIGS. 1 and 2. The equations are provided in Equation (18).

$$B_x = H_x + M_{xn}$$

$$B_y = H_y + M_{yn}$$

$$B_z = H_z + M_{zn} \quad (18)$$

With respect to Equation (18), B represents the magnetic flux density (Gauss), and H represents the magnetic field intensity (Oersted). The variable $M_n$ represents the residual induction of the $n^{th}$ magnet element (Gauss). A standard Narfmm magnet volume, for example, includes a constant "magnetic charge" density at the surface of the magnet on the North (positive charge) and South (negative charge) poles. The BH curves thus intersect at the points ($B_{xn}, H_{xn}$), ($B_{yn}$, $H_{yn}$), ($B_{zn}, H_{zn}$), wherein $B_n$ represents the magnetic flux density at the $n^{th}$ magnet element (Gauss), and $H_n$ represents the magnetic field intensity at the $n^{th}$ magnet element (Oersted).

In order to model the magnet, the values for $M_{xn}$, $M_{yn}$ and $M_{zn}$ for each $n^{th}$ volume element are determined. Each magnet element will lie somewhere on the actual BH curve line indicated by Equation (17). The magnet element can be modeled with the "$\mu$ equal to one BH curve" indicated in Equation (18) if the proper $M_{xn}$, $M_{yn}$ and $M_{zn}$ can be determined. If the intersection points ($B_{xn}, H_{xn}$), ($B_{yn}, H_{yn}$), ($B_{zn}, H_{zn}$) are known; $M_{xn}$, $M_{yn}$ and $M_{zn}$ can be determined, since the slope is equal to one. Equation (19) below thus represents this formulation.

$$M_{xn} = B_{xn} - H_{xn}$$

$$M_{yn} = B_{yn} - H_{yn}$$

$$M_{zn} = B_{zn} - H_{zn} \quad (19)$$

Once the $M_{xn}$, $M_{yn}$ and $M_{zn}$ are known, a standard magnet model (e.g., Narfmm) can be utilized for each magnet element, summing all of the magnet elements' contributions through superposition to obtain the magnetic field from the whole magnet. The defining relation for the flux density inside a magnet with $\mu$ equal to one is:

$$B = \mu \cdot H + M + B_e \quad (20)$$

With respect to Equation (20), B represents the magnetic flux density (Gauss), and $\mu$ represents the relative permeability, which is equal to one (Gauss/Oersted). Additionally, H represents the magnetic field intensity (Oersted), and M represents the residual magnetic induction (Gauss). $B_e$ represents the magnetic flux density from sources external to the magnet (Gauss).

For the $n^{th}$ magnet volume element, Equation (21) can be obtained by using (20) and replacing $\mu$ with 1.

$$B_{xn} = H_{xn} + M_{xn} + B_{xen}$$

$$B_{yn} = H_{yn} + M_{yn} + B_{yen}$$

$$B_{zn} = H_{zn} + M_{zn} + B_{zen} \quad (21)$$

$B_{xen}$, $B_{yen}$, $B_{zen}$ are the magnetic flux densities in the indicated direction on magnet element n from the other magnet elements (Gauss). Note that the center of the magnet volume element is used as the field point to determine the BH curve's intersection point in all equations. The larger the number of magnet elements, the smaller the element size, and the smaller the error associated with subdividing the magnet into a finite number of sections. Any arbitrary level of accuracy can be obtained by increasing the number of magnet elements to the proper level.

$H_{xn}$, $H_{yn}$, $H_{zn}$ can be expressed in normalized terms as shown in Equation (22).

$$H_{xn} = M_{xn} \cdot H_{xNn}$$

$$H_{yn} = M_{yn} \cdot H_{yNn}$$

$$H_{zn} = M_{zn} \cdot H_{zNn} \quad (22)$$

With respect to Equation (22), $H_{xNn}$, $H_{yNn}$, $H_{zNn}$ are the normalized H in the indicated direction at the center of the $n^{th}$ magnet element (Oersted/Gauss). $H_{Nn}$ is calculated with the standard Narfmm magnet equations by letting the residual induction be equal to unity. $B_{xen}$, $B_{yen}$, $B_{zen}$ can be expressed as a summation, as indicated in Equation (23).

$$B_{xen} = \sum_{\substack{m=1 \\ m \neq n}}^{P} (M_{xm} \cdot B_{xxNmn} + M_{ym} \cdot B_{yxNmn} + M_{zm} \cdot B_{zxNmn}) \quad (23)$$

$$B_{yen} = \sum_{\substack{m=1 \\ m \neq n}}^{P} (M_{xm} \cdot B_{xyNmn} + M_{ym} \cdot B_{yyNmn} + M_{zm} \cdot B_{zyNmn})$$

$$B_{zen} = \sum_{\substack{m=1 \\ m \neq n}}^{P} (M_{xm} \cdot B_{xzNmn} + M_{ym} \cdot B_{yzNmn} + M_{zm} \cdot B_{zzNmn})$$

With respect to Equation (23), the subscript on the B indicates the sub magnet orientation and the field direction. For example, "yx" on the B refers to a field in x direction from the y facing magnet element. P represents the total number of magnet elements. $B_{Nmn}$ represents the normalized magnetic flux density from magnet element m to magnet element n in the magnetized direction (no units). $B_{Nmn}$ is calculated with standard magnet modeling equations (e.g., Narfmm) by letting the residual induction of magnet element m be equal to unity. Substituting Equation (22) and Equation (23) into Equation (21) thus yields Equation (24).

$$B_{xn} = M_{xn} \cdot H_{xNn} + M_{xn} + \quad (24)$$
$$\sum_{\substack{m=1 \\ m \neq n}}^{P} (M_{xm} \cdot B_{xxNmn} + M_{ym} \cdot B_{yxNmn} + M_{zm} \cdot B_{zxNmn})$$

$$B_{yn} = M_{yn} \cdot H_{yNn} + M_{yn} +$$
$$\sum_{\substack{m=1 \\ m \neq n}}^{P} (M_{xm} \cdot B_{xyNmn} + M_{ym} \cdot B_{yyNmn} + M_{zm} \cdot B_{zyNmn})$$

$$B_{zn} = M_{zn} \cdot H_{zNn} + M_{zn} +$$
$$\sum_{\substack{m=1 \\ m \neq n}}^{P} (M_{xm} \cdot B_{xzNmn} + M_{ym} \cdot B_{yzNmn} + M_{zm} \cdot B_{zzNmn})$$

Combining Equations (17) and (18) to determine the intersection point of the two BH curve lines, and solving for $B_n$ yields Equation (25).

$$B_{xn} = \frac{-\alpha_x \cdot M_{xn}}{(1 - \alpha_x)} \quad (25)$$

$$B_{yn} = \frac{-\alpha_y \cdot M_{yn}}{(1 - \alpha_y)}$$

$$B_{zn} = \frac{B_{zr} - \alpha_z \cdot M_{zn}}{(1 - \alpha_z)}$$

Combining Equations (24) and (25) to eliminate $B_n$ yields Equation (26).

$$\frac{\alpha_x M_{xn}}{(1 - \alpha_x)} = M_{xn} \cdot H_{xNn} + M_{xn} + \quad (26)$$
$$\sum_{\substack{m=1 \\ m \neq n}}^{P} (M_{xm} \cdot B_{xxNmn} + M_{ym} \cdot B_{yxNmn} + M_{zm} \cdot B_{zxNmn})$$

-continued $$\frac{\alpha_y M_{yn}}{(1 - \alpha_y)} = M_{yn} \cdot H_{yNn} + M_{yn} +$$
$$\sum_{\substack{m=1 \\ m \neq n}}^{P} (M_{xm} \cdot B_{xyNmn} + M_{ym} \cdot B_{yyNmn} + M_{zm} \cdot B_{zyNmn})$$

$$\frac{B_{rz} - \alpha_z M_{zn}}{(1 - \alpha_z)} = M_{zn} \cdot H_{zNn} + M_{zn} +$$
$$\sum_{\substack{m=1 \\ m \neq n}}^{P} (M_{xm} \cdot B_{xzNmn} + M_{ym} \cdot B_{yzNmn} + M_{zm} \cdot B_{zzNmn})$$

In Equation (26) there are 3xP equations with 3xP unknowns since n takes on values from 1 to P. The 3xP unknowns are $M_{xn}$, $M_{yn}$, and $M_{zn}$. A linear set of equations comes from Equation (26) that can be transformed into matrix form.

$$\Psi \times \Phi = \Gamma \quad (27)$$

Generally, $\psi$ can represent a 3xP rows by 3xP columns matrix of known values. $\phi$ represents a 3xP rows by 1 columns matrix, with elements $M_{x1}$ through $M_{xP}$, $M_{y1}$ through $M_{yP}$ and $M_{z1}$ through $M_{zP}$. The variable $\Gamma$ can represent a 3xP rows by 1 column matrix of known values. To solve for the $M_{xn}$, $M_{yn}$ and $M_{zn}$ to use in the magnet model, solve for $\phi$.

$$\Phi = \Psi^{-1} \times \Gamma \quad (28)$$

The diagonal elements of $\psi$ are given in Equation (29).

$$\Psi_{kk} = H_{xNk} + 1 + \frac{\alpha_x}{1 - \alpha_x} \text{ for } k = 1 \text{ to } P \quad (29)$$

$$\Psi_{kk} = H_{yN(k-P)} + 1 + \frac{\alpha_y}{1 - \alpha_y} \text{ for } k = P + 1 \text{ to } 2 \cdot P$$

$$\Psi_{kk} = H_{zN(k-2P)} + 1 + \frac{\alpha_z}{1 - \alpha_z} \text{ for } k = 2 \cdot P + 1 \text{ to } 3 \cdot P$$

Each row of $\psi$, excluding the diagonals, is given in Equation (30).

$\Psi_{kj} = B_{xxNjk}$ for $k=1$ to $P$ and $j=1$ to $P$ and $k \neq j$ $\Psi_{kj} = B_{yxNj(k-P)}$ for $k=P+1$ to $2 \cdot P$ and $j=1$ to $P$ and $k \neq j$ $\Psi_{kj} = B_{zxNj(k-2 \cdot P)}$ for $k=2 \cdot P+1$ to $3 \cdot P$ and $j=1$ to $P$ and $k \neq j$ $\Psi_{kj} = B_{xy(j-P)k}$ for $k=1$ to $P$ and $j=P+1$ to $2 \cdot P$ and $k \neq j$ $\Psi_{kj} = B_{yyN(j-P)(k-P)}$ for $k=P+1$ to $2 \cdot P$ and $j=P+1$ to $2 \cdot P$ and $k \neq j$ $\Psi_{kj} = B_{zyN(j-P)(k-2 \cdot P)}$ for $k=2 \cdot P+1$ to $3 \cdot P$ and $j=P+1$ to $2 \cdot P$ and $k \neq j$ $\Psi_{kj} = B_{xzN(j-2 \cdot P)k}$ for $k=1$ to $P$ and $j=2 \cdot P+1$ to $3 \cdot P$ and $k \neq j$ $\Psi_{kj} = B_{yzN(j-2 \cdot P)(k-P)}$ for $k=P+1$ to $2 \cdot P$ and $j=2 \cdot P+1$ to $3 \cdot P$ and $k \neq j$ $\Psi_{kj} = B_{zzN(j-2 \cdot P)(k-2 \cdot P)}$ for $k=2 \cdot P+1$ to $3 \cdot P$ and $j=2 \cdot P+1$ to $3 \cdot P$ and $k \neq j$ (30)

In Equations (29) and (30), the subscript index on ψ indicates the row and column number of the matrix element respectively. Each element of Γ is given in Equation (31) below.

$$\Gamma_k = 0 \text{ for } k = 1 \text{ to } 2 \cdot P \quad (31)$$

$$\Gamma_k = \frac{B_{zr}}{1-\alpha_z} \text{ for } k = 2 \cdot P + 1 \text{ to } 3 \cdot P$$

FIGS. 2 and 3 thus generally depict a method for modeling a magnet with μ greater than one in both the magnetized and non-magnetized directions in a modeling software (e.g., Narfmm). Note that although the methodology described herein can be implemented in the context of a software programming tool such as, for example, Matlab, it can be appreciated by those skilled in the art that such a methodology may be implemented via any programming language, such as C or Fortran or via analog or digital circuitry. As indicated previously, although this model is primarily intended for use in modeling a block magnet, but it can be adapted for use in modeling any magnet of any shape or size.

Additionally, although the magnetization direction described above is in the z direction, the magnet can be magnetized in any direction by appropriately specifying ($\alpha_x$, $\alpha_y$, $\alpha_z$) and ($B_{rx}$, $B_{ry}$, $B_{rz}$).

In software models, the ferrous objects have an infinite permeability that is usually a good approximation for systems having the permanent magnet and ferrous object separated from each other and the area of interest where the magnetic field is calculated is in the space between the magnet and the ferrous object. If the need were to arise though, the method described earlier used to model permeability greater than one in the non-magnetized direction of the magnet can be used to model ferrous objects with permeability less than infinity.

Figure 4:
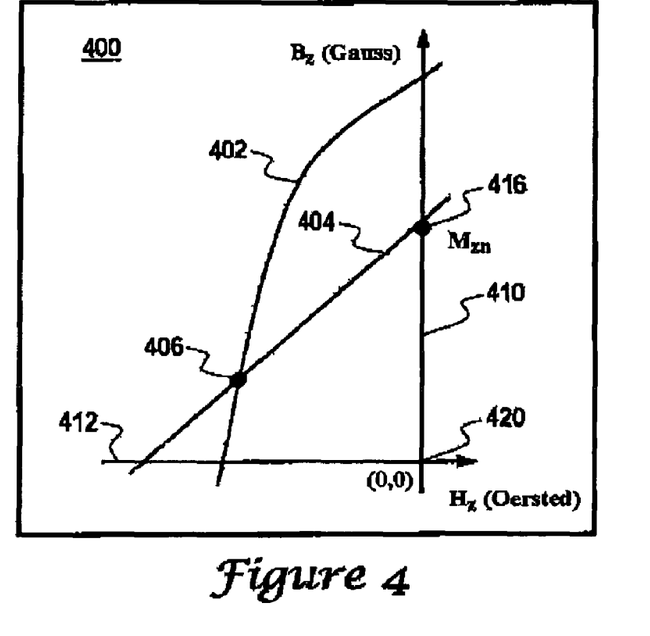
FIG. 4 depicts a graph illustrating a BH curve of a magnet and a BH curve in the magnetized Z-direction of the magnet to be modeled, in accordance with a preferred embodiment of the present invention.

FIG. 4 depicts a graph 400 depicting a BH curve 402 of a magnet and a BH curve 404 for an $n^{th}$ magnet element in the magnetized Z-direction of the magnet to be modeled, in accordance with a preferred embodiment of the present invention. Graph 400 includes an axis 410 perpendicular to an axis 412. BH curves 402 and 404 intersect one another at intersection point 406 ($B_{zn}$, $H_{zn}$). BH curve 404 intersects axis 410 at point 416 ($M_{zn}$). An originating point 420 (0,0) is positioned at the intersection of axis 410 and 412. BH curve 402 thus represents the actual BH curve in the magnetized Z direction of a magnet to be modeled: $F_z$. BH curve 404 represents a BH curve for the $n^{th}$ magnet element in the Z direction, wherein $B_z = H_z + M_{zn}$.

Figure 5:
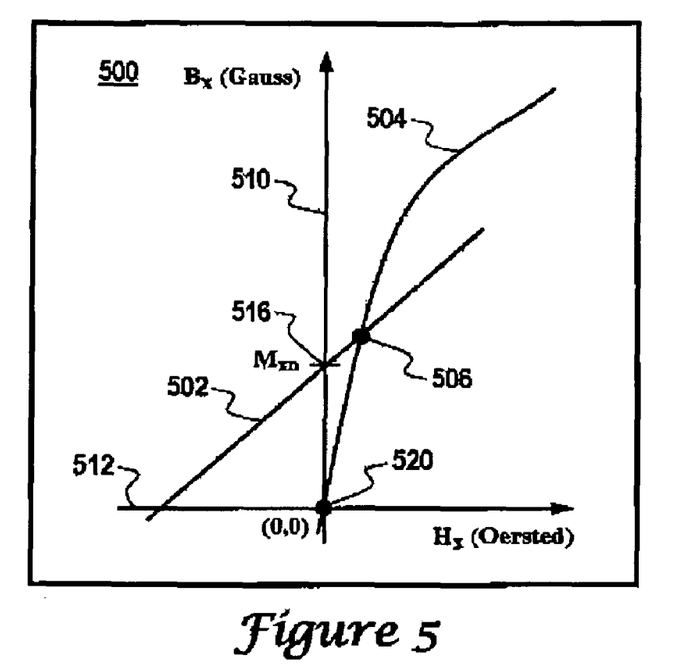
FIG. 5 depicts a graph illustrating a BH curve of a magnet and a BH curve of magnet elements in a non-magnetized X-direction, in accordance with a preferred embodiment of the present invention.

FIG. 5 illustrates a graph illustrating a BH curve 504 of a magnet to be modeled and a BH curve 502 of magnet elements in a non-magnetized X-direction, in accordance with a preferred embodiment of the present. invention. Note that the BH curve in the Y direction is essentially analogous to the BH curve in the X direction. An axis 510 intersects an axis 512 at an originating point 520 (0,0). BH curve 504 thus represents the actual BH curve of the magnet to be modeled in a non-magnetized X-direction: $F_x$. BH curve 502 represents a BH curve for the $n^{th}$ magnet element in the X-direction, wherein $B_x = H_x + M_{xn}$. BH curves 504 and 502 intersect one another at intersection point 506 ($B_{xn}$, $H_{xn}$). BH curve 502 also intersects axis 510 at point 516 ($M_{xn}$).

Figure 6:
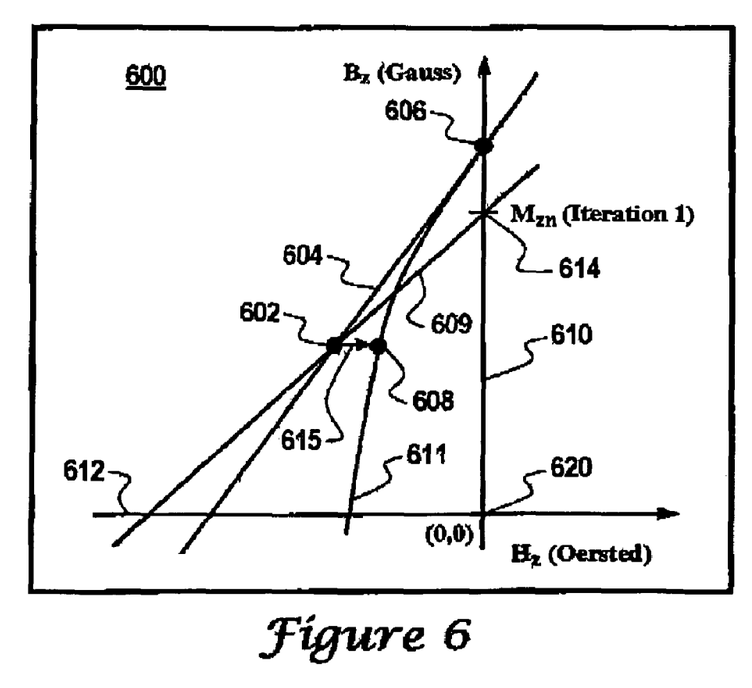
FIG. 6 depicts a first iteration for a magnet element in a Z-direction, in accordance with a preferred embodiment of the present invention.

FIG. 6 depicts a graph 600 illustrating a first iteration for a magnet element in a Z-direction, in accordance with a preferred embodiment of the present invention. FIG. 6 depicts an axis 612 and an axis 610, which intersect one another at an origination point 620 (0,0). As indicated by graph 600 of FIG. 6, an intermediate BH curve 604 for a first iteration crosses axis 610 at point 606, which comprises a tangent point between an intermediate BH curve and the actual BH curve for the first iteration in which $B_z = a_{zn}*H_z + b_z$. BH curve 604 also intersects a BH curve 609 at intersection point 602 (i.e., intersection point, iteration 1). Note that graph 600 also illustrates a tangent point 608 for a second iteration for a curve 611. Tangent point 608 is selected as a point on BH curve 611 close to point 602. In this example, the close point is selected by going the smallest horizontal distance from point 602 to BH curve 611, thus arriving at point 602 as indicated by arrow 615. Note that BH curve 609 intersects axis 610 at point 614 (i.e., $M_{zn}$, iteration 1).

Figure 7:
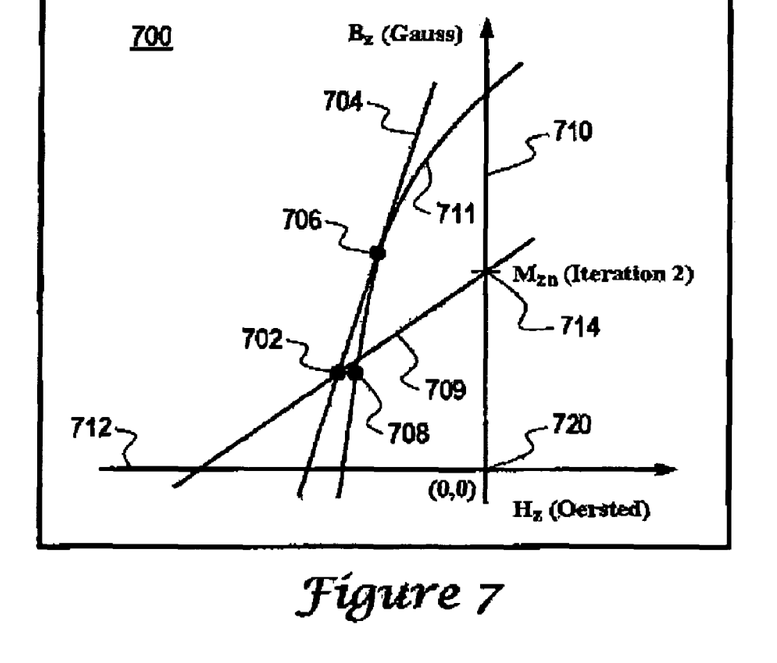
FIG. 7 depicts a second iteration for a magnet element in a Z-direction, in accordance with a preferred embodiment of the present invention.

FIG. 7 depicts a graph 700 illustrating a second iteration for a magnet element in a Z-direction, in accordance with a preferred embodiment of the present invention. FIG. 7 illustrates an axis 712, which generally intersects an axis 710 at an origination point 720 (0,0). An intermediate BH curve 704 for the second iteration intersects a curve 711 at a tangent point 706 (i.e., iteration 2). Additionally, BH curve 704 intersects a curve 709 at an intersection point 702 (i.e., iteration 2). Note that graph 700 also illustrates a tangent point 708 for a third iteration for a curve 711. Tangent point 708 is selected as a point on BH curve 711 close to point 702. BH curve 709 also intersects axis 710 at point 714 ($M_{zn}$, iteration 2).

Figure 8:
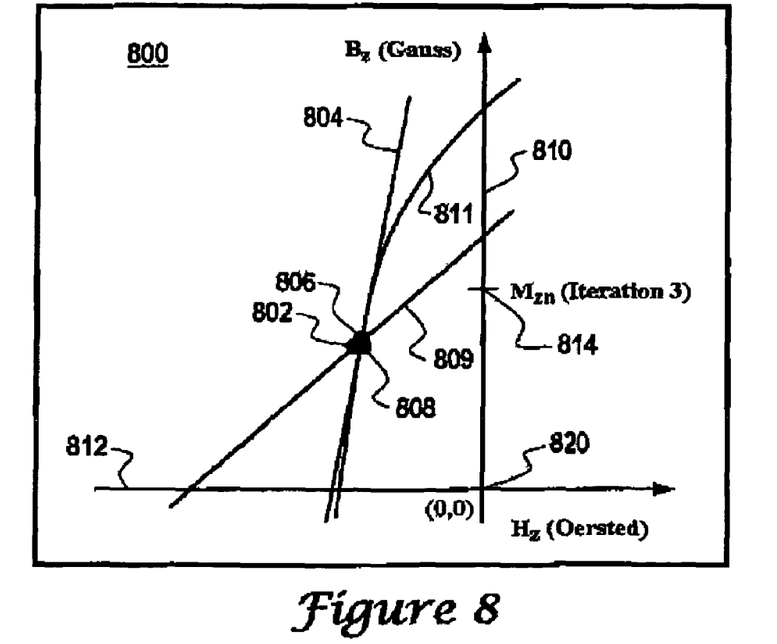
FIG. 8 depicts a third iteration for a magnet element in a Z-direction, in accordance with a preferred embodiment of the present invention.

FIG. 8 depicts a graph 800 illustrating a third iteration for a magnet element in a Z-direction, in accordance with a preferred embodiment of the present invention. Graph 800 generally depicts an axis 812, which intersects with an axis 810 at an origination point 820 (0,0). An intermediate BH curve 804 for the third iteration intersects a curve 811 at a tangent point 806 (i.e., iteration 3). Additionally, BH curve 804 intersects a curve 809 at an intersection point 802 (i.e., iteration 3). Note that graph 800 also illustrates a tangent point 808. Tangent point 808 is selected as a point on BH curve 811 close to point 802. Point 808 is used to derive the final tangent line to be used as the BH curve for the nth magnet element if the desired accuracy has resulted in point 802 and 808 being sufficiently converged. If additional accuracy is needed, additional iterations can be executed. BH curve 809 additionally intersects axis 810 at a point 814 ($M_{zn}$, iteration 3).

In FIGS. 1 to 4, a method for modeling magnets with straight-line BH curves with permeability (μ) greater than one, in both the magnetized and non-magnetized directions is described with respect to modeling software. FIGS. 5 to 8 generally expand on that method by describing a method for modeling anisotropic magnets with non-linear BH curves in the magnetized and non-magnetized directions. Such a model can permit a designer to accurately model, for example, an anisotropic AlNiCo magnet utilized in a gear tooth sensor.

The magnet to be modeled generally can be configured with nonlinear BH curves, as illustrated in FIGS. 4 and 5, and also described below with respect to Equation (32). Assume the magnet is magnetized in the z direction.

$$F_x, F_y, F_z \quad (32)$$

The x, y and z subscripts denote spatial direction. This denotation generally applies for all the equations indicated herein with respect to FIGS. 4 to 8. The F variables are generally functions of H and B. For the modeling method described herein with respect to FIGS. 4 to 8, such functions can be expressed generally in any form that is monotonic and increasing in B and H; linear or nonlinear; capable of being evaluated for B given H; capable of being evaluated for H given B; and which can be evaluated for the slope at any given point of the curve. Generally, H represents the magnetic field intensity (Oersted). B, on the other hand, generally represents the magnetic flux density (Gauss).

The magnet volume can be divided into volume elements. Each $n^{th}$ volume element itself is a magnet that can be modeled with the standard Narfmm software magnet model given the BH curve 404 and 502 such as illustrated in FIGS. 4 and 5. The appropriate equations are indicated below in Equation (33).

$$B_x = H_x + M_{xn}$$

$$B_y = H_y + M_{yn}$$

$$B_z = H_z + M_{zn} \tag{33}$$

With respect to Equation (33) above, B generally represents the magnetic flux density (Gauss). H represents the magnetic field intensity (Oersted). $M_n$ represents the residual induction of the $n^{th}$ magnet element (Gauss).

The BH curves of Equations (32) and (33) intersect at the points $(B_{xn}, H_{xn})$, $(B_{yn}, H_{yn})$, $(B_{zn}, H_{zn})$. In this case, $B_n$ represents the magnetic flux density at the $n^{th}$ magnet element (Gauss), and $H_n$ represents the magnetic field intensity at the nth magnet element (Oersted). In order to model a magnet using modeling software (e.g., Narfmm), the variables $M_{xn}$, $M_{yn}$ and $M_{zn}$ must be determined for each $n^{th}$ volume element. Each magnet element lies somewhere on the actual BH curve line indicated by Equation (32). The magnet element can be modeled with the "µ equal to one BH curve" indicated by Equation (33) if the proper $M_{xn}$, $M_{yn}$ and $M_{zn}$ can be determined. If the intersection points $(B_{xn}, H_{xn})$, $(B_{yn}, H_{yn})$, $(B_{zn}, H_{zn})$ are known; $M_{xn}$, $M_{yn}$ and $M_{zn}$ can be determined. Thus, the following formulation can be solved for Equation (34):

$$M_{xn} = B_{xn} - H_{xn}$$

$$M_{yn} = B_{yn} - H_{yn}$$

$$M_{zn} = B_{zn} - H_{zn} \tag{34}$$

Once all of the variables $M_{xn}$, $M_{yn}$ and $M_{zn}$ are known, a standard magnet model can be utilized for each magnet element, summing all of the magnet elements' contributions through superposition to obtain the magnetic field from the whole magnet. The defining relation for the flux density inside a magnet can be calculated as follows.

$$B = \mu \cdot H + M + B_e \tag{35}$$

Thus, with respect to Equation (35) above, the variable B represents the magnetic flux density (Gauss). The variable µ represents the relative permeability, which is equal to one (Gauss/Oersted). Additionally, the variable H represents the magnetic field strength (Oersted). M represents the residual magnetic induction (Gauss). $B_e$ represents the magnetic flux density from sources external to the magnet (Gauss). For the $n^{th}$ magnet volume element, Equation (36) can be obtained utilizing Equation (35) and replacing µ with 1.

$$B_{xn} = H_{xn} + M_{xn} + B_{xen}$$

$$B_{yn} = H_{yn} + M_{yn} + B_{yen}$$

$$B_{zn} = H_{zn} + M_{zn} + B_{zen} \tag{36}$$

With respect to Equation (35), the variables $B_{en}$ generally represent the magnetic flux densities on magnet element n from the other magnet elements (Gauss). Note that the center of the magnet volume element is used as the field point to determine the BH curve's intersection point in all equations. The larger the number of magnet elements, the smaller the element size, and the smaller the error associated with subdividing the magnet into a finite number of sections. Any arbitrary level of accuracy can be obtained by increasing the number of magnet elements to the proper level. $H_n$ can be expressed in normalized terms, as indicated below in Equation (37).

$$H_{xn} = M_{xn} \cdot H_{xNn}$$

$$H_{yn} = M_{yn} \cdot H_{yNn}$$

$$H_{zn} = M_{zn} \cdot H_{zNn} \tag{37}$$

$H_{Nn}$ represents the normalized $H_n$ in the indicated direction at the center of the $n^{th}$ magnet element (Oersted/Gauss). $H_{Nn}$ can be calculated with standard magnet modeling equations by letting the residual induction be equal to unity. $B_{en}$ can be expressed as a summation as indicated in Equation (38).

$$B_{xen} = \sum_{\substack{m=1 \\ m \neq n}}^{P} (M_{xm} \cdot B_{xxNmn} + M_{ym} \cdot B_{yxNmn} + M_{zm} \cdot B_{zxNmn})$$

$$B_{yen} = \sum_{\substack{m=1 \\ m \neq n}}^{P} (M_{xm} \cdot B_{xyNmn} + M_{ym} \cdot B_{yyNmn} + M_{zm} \cdot B_{zyNmn})$$

$$B_{zen} = \sum_{\substack{m=1 \\ m \neq n}}^{P} (M_{xm} \cdot B_{xzNmn} + M_{ym} \cdot B_{yzNmn} + M_{zm} \cdot B_{zzNmn}) \tag{38}$$

In the right-hand side of Equation (38), the subscript on the B indicates the sub magnet orientation and the field direction. For example, "yx" refers to a field in x direction from the y facing magnet element. P represents the total number of magnet elements. $B_{Nmn}$ represents the normalized magnetic flux density from magnet element m to magnet element n in the magnetized direction (no units). $B_{Nmn}$ can be calculated with the standard magnet modeling equations by letting the residual magnetic induction of magnet element m be equal to unity. Thus, substituting Equation (37) and Equation (38) into Equation (36) yields Equation (39).

$$B_{xn} = M_{xn} \cdot H_{xNn} + M_{xn} + \tag{39}$$

$$\sum_{\substack{m=1 \\ m \neq n}}^{P} (M_{xm} \cdot B_{xxNmn} + M_{ym} \cdot B_{yxNmn} + M_{zm} \cdot B_{zxNmn})$$

$$B_{yn} = M_{yn} \cdot H_{yNn} + M_{yn} +$$

$$\sum_{\substack{m=1 \\ m \neq n}}^{P} (M_{xm} \cdot B_{xyNmn} + M_{ym} \cdot B_{yyNmn} + M_{zm} \cdot B_{zyNmn})$$

$$B_{zn} =$$

$$M_{zn} \cdot H_{zNn} + M_{zn} + \sum_{\substack{m=1 \\ m \neq n}}^{P} (M_{xm} \cdot B_{xzNmn} + M_{ym} \cdot B_{yzNmn} + M_{zm} \cdot B_{zzNmn})$$

In order to determine the intersection point of the two BH curves illustrated in Equations (32) and (33), an iterative process is thus used. The first iteration involves assuming another form for the BH curve indicated by Equation (32), which is referred to as the intermediate BH curve given in Equation (40).

$$B_x = \alpha_{xn} \cdot H_x + b_{xn}$$

$$B_y = \alpha_{yn} \cdot H_y + b_{yn}$$

$$B_z = \alpha_{zn} \cdot H_z + b_{zn} \tag{40}$$

With respect to Equation (40), B represents the magnetic flux density (Gauss). The variable $\alpha_n$ represents the slope of F at the tangent point explained below (Gauss/Oersted). The variable $b_n$ represents the B intercept of F for the $n^{th}$ magnet element (Gauss).

Refer to FIG. 6 for an illustration of the first iteration. The BH curve of equation (32) and (40) have a tangent point at the B intercept of F. Assuming equation (40) in place of (32), the intersection point is determined. From the intersection point, the tangent point for iteration 2 is selected by finding the point on F that has the same B value as the intersection point. In the second iteration, a new $\alpha_n$ and $b_n$ is selected based on the tangent point as is illustrated in FIG. 7. Then the second iteration intersection point is determined and the third iteration tangent point selected in the same manner as before. This process is then repeated as illustrated in FIG. 8, which depicts the third iteration tangent point and intersection point, along with the fourth iteration tangent point. These three points now all lie very close together and can converge with each iteration. So it can be seen that the tangent point and intersection points converge onto the actual BH curve F. The iterations can be continued until the desired accuracy is obtained. This numerical iterative process converges very quickly and it is expected that approximately four iterations will be sufficient for most modeling applications. Note that in the first iteration all of the $\alpha_n$ and $b_n$ (within a given direction X, Y or Z) will be the same since they all refer to the same starting function F. After the first iteration however they will in general not have the same value.

The equations to be used for each step of the iterative process are developed as further described below. Combining Equation (33) and (40) to determine the intersection point of the two BH curve lines, and solving for $B_n$ yields (41).

$$B_{xn} = \frac{b_{xn} - \alpha_{xn} \cdot M_{xn}}{(1 - \alpha_{xn})}$$

$$B_{yn} = \frac{b_{yn} - \alpha_{yn} \cdot M_{yn}}{(1 - \alpha_{yn})}$$

$$B_{zn} = \frac{b_{zn} - \alpha_{zn} \cdot M_{zn}}{(1 - \alpha_{zn})}$$

(41)

Combining Equations (39) and (41) to eliminate $B_n$ yields Equation (42).

$$\frac{b_{xn} - \alpha_{xn} \cdot M_{xn}}{(1 - \alpha_{xn})} =$$

$$M_{xn} \cdot H_{xNn} + M_{xn} + \sum_{\substack{m=1 \\ m \neq n}}^{P} (M_{xm} \cdot B_{xxNmn} + M_{ym} \cdot B_{yxNmn} + M_{zm} \cdot B_{zxNmn})$$

$$\frac{b_{yn} - \alpha_{yn} \cdot M_{yn}}{(1 - \alpha_{yn})} = M_{yn} \cdot H_{yNn} + M_{yn} +$$

$$\sum_{\substack{m=1 \\ m \neq n}}^{P} (M_{xm} \cdot B_{xyNmn} + M_{ym} \cdot B_{yyNmn} + M_{zm} \cdot B_{zyNmn})$$

$$\frac{b_{zn} - \alpha_{zn} \cdot M_{zn}}{(1 - \alpha_{zn})} =$$

$$M_{zn} \cdot H_{zNn} + M_{zn} + \sum_{\substack{m=1 \\ m \neq n}}^{P} (M_{xm} \cdot B_{xzNmn} + M_{ym} \cdot B_{yzNmn} + M_{zm} \cdot B_{zzNmn})$$

(42)

In Equation (42) there are 3×P equations with 3×P unknowns since n takes on values from 1 to P. The 3×P unknowns are $M_{xn}$, $M_{yn}$ and $M_{zn}$. A linear set of equations is derived from Equation (42) that can be transformed into matrix form, as indicated in Equation (43).

$$\Psi \times \Phi = \Gamma \quad (43)$$

Thus, with respect to Equation (43), the variable $\psi$ represents a 3×P rows by 3×P columns matrix of known values. The variable $\phi$ represents a 3×P rows by 1 columns matrix, with elements $M_{x\,1}$ through $M_{xP}$, $M_{y1}$ through $M_{yP}$ and $M_{z1}$ through $M_{zP}$. The variable $\Gamma$ represents a 3×P rows by 1 column matrix of known values. To solve for the $M_{xn}$, $M_{yn}$ and $M_{zn}$, solve for $\phi$.

$$\Phi = \Psi^{-1} \times \Gamma \quad (44)$$

The diagonal elements of $\psi$ are as follows.

$$\Psi_{kk} = H_{xNk} + 1 + \frac{\alpha_{xk}}{1 - \alpha_{xk}} \text{ for } k = 1 \text{ to } P$$

$$\Psi_{kk} = H_{yN(k-P)} + 1 + \frac{\alpha_{yk}}{1 - \alpha_{yk}} \text{ for } k = P+1 \text{ to } 2 \cdot P$$

$$\Psi_{kk} = H_{zN(k-2P)} + 1 + \frac{\alpha_{zk}}{1 - \alpha_{zk}} \text{ for } k = 2 \cdot P + 1 \text{ to } 3 \cdot P$$

(45)

Each row of $\psi$, excluding the diagonals, is as follows.

$\Psi_{kj} = B_{xxNjk}$ for $k=1$ to $P$ and $j=1$ to $P$ and $k \neq j$ $\Psi_{kj} = B_{yxNj(k-P)}$ for $k=P+1$ to $2 \cdot P$ and $j=1$ to $P$ and $k \neq j$ $\Psi_{kj} = B_{zxNj(k-2\,P)}$ for $k=2 \cdot P+1$ to $3 \cdot P$ and $j=1$ to $P$ and $k \neq j$ $\Psi_{kj} = B_{xy(j-P)k}$ for $k=1$ to $P$ and $j=P+1$ to $2 \cdot P$ and $k \neq j$ $\Psi_{kj} = B_{yyN(j-P)(k-P)}$ for $k=P1$ to $2 \cdot P$ and $j=P+1$ to $2 \cdot P$ and $k \neq j$ $\Psi_{kj} = B_{zyN(j-P)(k-2\,P)}$ for $k=2 \cdot P+1$ to $3 \cdot P$ and $j=P+1$ to $2 \cdot P$ and $k \neq j$ $\Psi_{kj} = B_{xzN(j-2\,P)}$ for $k=1$ to $P$ and $j=2 \cdot P1$ to $3 \cdot P$ and $k \neq j$ $\Psi_{kj} = B_{yzN(j-2\,P)}$ for $k=P1$ to $2 \cdot P$ and $j=2 \cdot P+1$ to $3 \cdot P$ and $k \neq j$ $\Psi_{kj} = B_{zzN(j-2\,P)(k-2\,P)}$ for $k=2 \cdot P+1$ to $3 \cdot P$ and $j=2 \cdot P+1$ to $3 \cdot P$ and $k \neq j$ (46)

In Equations (45) and (56), the subscript index on $\psi$ indicates the row and column number of the matrix element respectively. Each element of $\Gamma$ is as follows:

$$\Gamma_k = \frac{b_{xk}}{1 - \alpha_{xk}} \text{ for } k = 1 \text{ to } P$$

$$\Gamma_k = \frac{b_{y(k-P)}}{1 - \alpha_{y(k-P)}} \text{ for } k = P+1 \text{ to } 2 \cdot P$$

$$\Gamma_k = \frac{b_{z(k-2P)}}{1 - \alpha_{z(k-2P)}} \text{ for } k = 2 \cdot P + 1 \text{ to } 3 \cdot P$$

(47)

Those skilled in the art can appreciate that the present invention can be implemented in the context of a module or group of modules. The term "module" as known by those skilled in the computer programming arts is generally a collection of routines, subroutines, and/or data structures, which perform a particular task or implements certain abstract data types. Modules generally are composed of two sections. The first section is an interface, which compiles the constants, data types, variables, and routines. The second section is generally configured to be accessible only by the module and which includes the source code that activates the routines in the module or modules thereof.

A software implementation of the present invention may thus involve the use of such modules, and/or implementation of a program product based on the mathematical and operational steps illustrated in and described herein. Such a program product may additionally be configured as signal-bearing media, including recordable and/or transmission media. The mathematical and operation steps illustrated and described herein can thus be implemented as program code, a software module or series of related software modules. Such modules may be integrated with hardware to perform particular operational functions.

Figure 9:
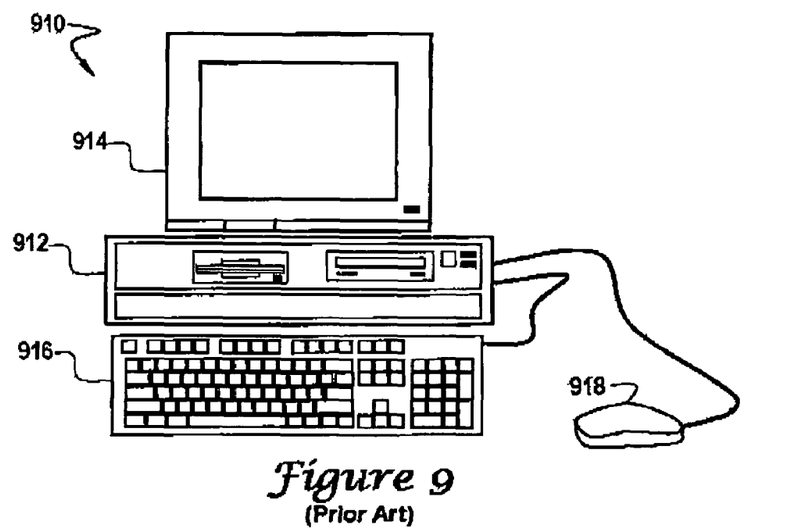
FIG. 9 illustrates a pictorial representation of a data processing system, which may be utilized in accordance with the method and system of the present invention.

FIG. 9 illustrates a pictorial representation of a data processing system 910, which may be utilized in accordance with the method and system of the present invention. The method and system described herein, including module implementations thereof, may be implemented in a data processing system such as data processing system 910 of FIG. 9. Thus, data processing system 910 is illustrated herein to indicate a possible machine in which the present invention may be embodied. Those skilled in the art can appreciate, however, that the data processing system illustrated in FIGS. 9 and 10 herein is presented for illustrative purposes only and is not considered a limiting feature of the present invention.

Data processing system 910 can be implemented as a computer, which includes a system unit 912, a video display terminal 914, an alphanumeric input device (i.e., keyboard 916) having alphanumeric and other keys, and a mouse 918. An additional input device (not shown) such as a trackball or stylus can also be included with data processing system 910. Although the depicted embodiment involves a personal computer, an embodiment of the present invention may be implemented in other types of data processing systems, such as, for example, intelligent workstations or mini-computers. Data processing system 910 also preferably includes a graphical user interface that resides within a machine-readable media to direct the operation of data processing system 910.

Figure 10:
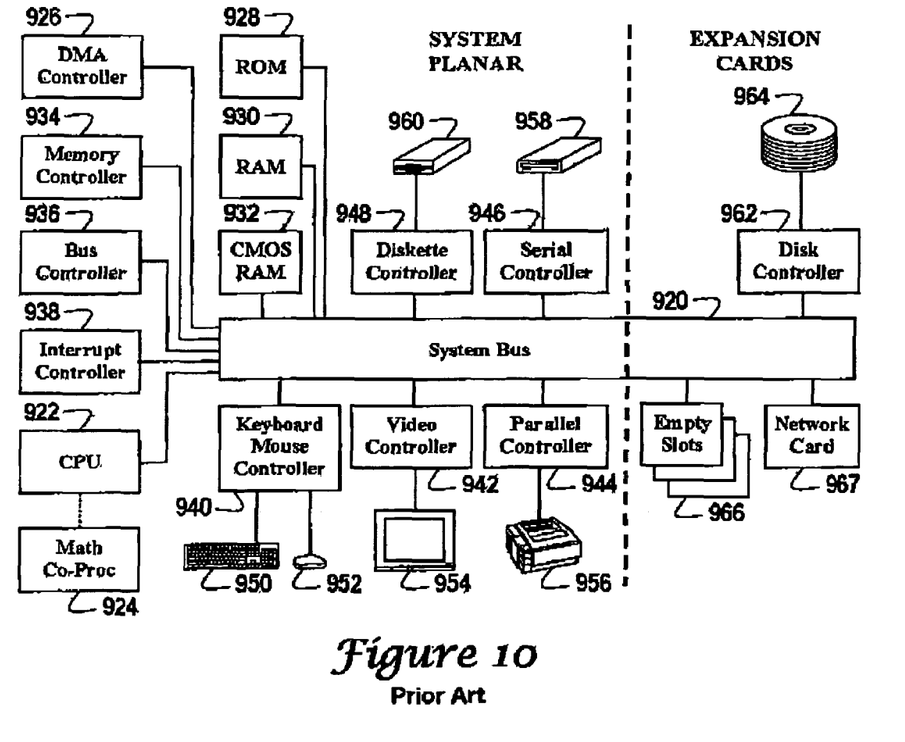
FIG. 10 depicts a block diagram illustrative of selected components in a computer system, which can be utilized in accordance with the method and system of the present invention.

Referring now to FIG. 10 there is depicted a block diagram of selected components in data processing system 910 of FIG. 9 in which a preferred embodiment of the present invention may be implemented. Data processing system 910 of FIG. 9 preferably includes a system BUS 920, as depicted in FIG. 10. System BUS 920 is utilized for interconnecting and establishing communication between various components in data processing system 910. Microprocessor or CPU (Central Processing Unit) 922 is connected to system BUS 920 and also may have numeric coprocessor 924 connected to it. Direct memory access ("DMA") controller 926 is also connected to system BUS 920 and allows various devices to appropriate cycles from microprocessor 922 during large input/output ("I/O") transfers. Read Only Memory ("ROM") 928 and Random Access Memory ("RAM") 930 are also connected to system BUS 920. ROM 928 can be mapped into the address space of microprocessor 922. CMOS RAM 932 is generally attached to system BUS 920 and contains system configuration information. Any suitable machine-readable media may retain the graphical user interface of data processing system 910 of FIG. 9, such as RAM 930, ROM 928, a magnetic diskette, magnetic tape, or optical disk.

Also connected to system BUS 920 are memory controller 934, BUS controller 936, and interrupt controller 938, which serve to aid in the control of data flow through system BUS 920 among various peripherals, adapters, and devices. System unit 912 of FIG. 9 also contains various I/O controllers such as those depicted in FIG. 10: keyboard and mouse controller 940, video controller 942, parallel controller 944, serial controller 946, and diskette controller 948. Keyboard and mouse controller 940 provide a hardware interface for keyboard 950 and mouse 952 although other input devices can be used. Video controller 942 provides a hardware interface for video display terminal 954. Parallel controller 944 provides a hardware interface for devices such as printer 956. Serial controller 946 provides a hardware interface for devices such as a modem 958. Diskette controller 948 provides a hardware interface for floppy disk unit 960.

Expansion cards also may be added to system bus 920, such as disk controller 962, which provides a hardware interface for hard disk unit 964. Empty slots 966 are provided so that other peripherals, adapters, and devices may be added to system unit 912 of FIG. 9. A network card 967 additionally can be connected to system bus 920 in order to link system unit 912 of FIG. 9 to other data processing system networks in a client/server architecture, or to groups of computers and associated devices which are connected by communications facilities. Those skilled in the art will appreciate that the hardware depicted in FIG. 10 may vary for specific applications. For example, other peripheral devices such as: optical disk media, audio adapters, or chip programming devices such as a PAL or EPROM programming devices, and the like also may be utilized in addition to or in place of the hardware already depicted. Note that any or all of the above components and associated hardware may be utilized in various embodiments. It can be appreciated, however, that any configuration of the aforementioned system may be utilized for various purposes according to a particular implementation. FIGS. 9-10 therefore generally describe a system/apparatus 910 composed of one or more processor readable storage devices having a processor readable code (e.g., a module) embodied on the processor readable storage devices. The processor readable storage devices can be then used for programming one or more processors to perform the methodology described herein, including each of the method steps of such a methodology.

The present invention can be used in various magnetic modeling scenarios. For example, the present invention can be use to design sensors that contain permanent magnets. Such sensors include gear tooth sensors.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive nor to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

The invention claimed is:

1. A computer-implementable method for magnetostatic modeling of a magnetic object, said method implementable utilizing a computer comprising a processor and a data bus coupled to said processor, said computer further comprising a computer-usable medium embodying computer code, said computer-usable medium coupled to said data bus, said computer code comprising instructions executable by said processor and configured for implementing said method, said method comprising the steps of:

determining a BH curve of said magnetic object utilizing said computer;

dividing a computer representation of said magnetic object into a plurality of magnet volume elements utilizing said computer;

calculating a magnetic flux density and a magnetic field intensity for each magnet volume element among said plurality of magnet volume elements utilizing said computer;

calculating a point on said BH curve of said magnetic object wherein said magnetic flux density and said magnetic field intensity of said each magnet volume element of said plurality of magnet volume elements crosses said BH curve of said magnetic object utilizing said computer;

calculating a plurality of BH curves wherein a single BH curve is calculated for said each magnet volume element of said plurality of magnet volume elements by assigning a relative permeability ($\mu$) of 1.0 to said each magnet volume element utilizing said computer;

determining a residual induction ($M_n$) of said each magnet volume element of said plurality of magnet volume elements utilizing said plurality of BH curves utilizing said computer;

creating a plurality of magnet volume element models by utilizing a magnet modeling module to model said each magnet volume element among said plurality of magnet volume elements utilizing said residual induction ($M_n$) of said each magnet volume element utilizing said computer; and     thereafter summing said plurality of magnet volume models through superposition to thereby improve the magnetic modeling of said magnetic object for use in designing and implementing magnetic objects for use in magnetic-based applications by configuring said model utilizing said computer.

2. The computer-implementable method of claim 1 wherein said BH curve of said magnetic object and said plurality of BH curves for said plurality of magnet volume elements are calculated in a magnetized spatial direction utilizing said computer.

3. The computer-implementable method of claim 1 wherein said BH curve of said magnetic object and said plurality of BH curves for said plurality of magnet volume elements are calculated in a non-magnetized spatial direction utilizing said computer.

4. The computer-implementable method of claim 1 wherein said relative permeability ($\mu$) of said magnetic object is greater than 1.0.

5. The computer-implementable method of claim 1 wherein said magnetic object comprises an AlNiCo-based magnet.

6. The computer-implementable method of claim 2 wherein said relative permeability ($\mu$) of said magnetic object is greater than 1.0.

7. The computer-implementable method of claim 5 wherein said BH curve of said magnetic object and said plurality of BH curves for said plurality of magnet volume elements are calculated in a non-magnetized direction utilizing said computer.

8. The computer-implementable method of claim 1 wherein said magnetic object comprises an NdFeB-based magnet.

9. The computer-implementable method of claim 8 wherein said relative permeability ($\mu$) of said magnetic object is less than infinity.

10. A computer-implementable method for magnetostatic modeling of a magnetic object, said method implementable utilizing a computer comprising a processor and a data bus coupled to said processor, said computer further comprising a computer-usable medium embodying computer code, said computer-usable medium coupled to said data bus, said computer code comprising instructions executable by said processor and configured for implementing said method, said method comprising the steps of:

determining a BH curve of said magnetic object utilizing said computer, wherein said magnetic object comprises an anisotropic magnet;

dividing a computer representation of said magnetic object into a plurality of magnet volume elements utilizing said computer;

calculating a magnetic flux density and a magnetic field intensity for each magnet volume element among said plurality of magnet volume elements utilizing said computer;

calculating a point on said BH curve of said magnetic object wherein said magnetic flux density and said magnetic field intensity of said each magnet volume element among said plurality of magnet volume elements crosses said BH curve of said magnetic object utilizing said computer;

calculating a plurality of BH curves utilizing said computer, wherein a single BH curve is calculated for said each magnet volume element of said plurality of magnet volume elements by assigning a relative permeability ($\mu$) of 1.0 to said each magnet volume element;

determining, utilizing said computer, a residual induction ($M_n$) of said each magnet volume element of said plurality of magnet volume elements utilizing said plurality of BH curves;

creating, utilizing said computer, a plurality of magnet volume element models by utilizing a magnet modeling module to model said each magnet volume element of said plurality of magnet volume elements utilizing said residual induction ($M_n$) of said each magnet volume element; and     thereafter summing said plurality of magnet volume models utilizing said computer through superposition to thereby improve the magnetic modeling of said magnetic object for use in designing and implementing magnetic objects for use in magnetic-based applications by configuring said model utilizing said computer.

11. The computer-implementable method of claim 10 wherein said BH curve of said magnetic object and said plurality of BH curves for said plurality of magnet volume elements are calculated in a magnetized spatial direction utilizing said computer.

12. The computer-implementable method of claim 11 wherein said relative permeability ($\mu$) of said magnetic object is greater than 1.0.

13. The computer-implementable method of claim 10 wherein said BH curve of said magnetic object and said plurality of BH curves for said plurality of magnet volume elements are calculated in a non-magnetized spatial direction utilizing said computer.

14. The computer-implementable method of claim 10 wherein said relative permeability ($\mu$) of said magnetic object is greater than 1.0.

15. The computer-implementable method of claim 10 wherein said magnetic object comprises an AlNiCo-based magnet.

16. The computer-implementable method of claim 15 wherein said relative permeability ($\mu$) of said magnetic object is greater than 1.0.

17. The computer-implementable method of claim 15 wherein said BH curve of said magnetic object and said plurality of BH curves for said plurality of magnet volume elements are calculated in a non-magnetized spatial direction utilizing said computer.

18. The computer-implementable method of claim 17 wherein said relative permeability ($\mu$) of said magnetic object is less than infinity.

19. The computer-implementable method of claim 18 wherein said BH curves of said magnetic object and said plurality of BH curves for said plurality of magnet volume elements are calculated in a magnetized spatial direction utilizing said computer.

20. The computer-implementable method of claim 18 wherein said BH curve of said magnetic object and said plurality of BH curves for said plurality of magnet volume elements are calculated in a non-magnetized spatial direction utilizing said computer.

21. An apparatus comprising one or more processor readable storage devices having a processor readable code embodied on said processor readable storage devices, said processor readable code for programming one or more processors to perform a method comprising the steps of:

determining a BH curve of said magnetic object;

dividing a computer representation of said magnetic object into a plurality of magnet volume elements;

calculating a magnetic flux density and a magnetic field intensity for each magnet volume element among said plurality of magnet volume elements;

calculating a point on said BH curve of said magnetic object wherein said magnetic flux density and said magnetic field intensity of said each magnet volume element of said plurality of magnet volume elements crosses said BH curve of said magnetic object;

calculating a plurality of BH curves wherein a single BH curve is calculated for said each magnet volume element of said plurality of magnet volume elements by assigning a relative permeability ($\mu$) of 1.0 to said each magnet volume element;

determining a residual induction ($M_n$) of said each magnet volume element of said plurality of magnet volume elements utilizing said plurality of BH curves;

creating a plurality of magnet volume element models by utilizing a magnet modeling module to model said each magnet volume element among said plurality of magnet volume elements utilizing said residual induction ($M_n$) of said each magnet volume element; and thereafter summing said plurality of magnet volume models through superposition to thereby improve the magnetic modeling of said magnetic object for use in designing and implementing magnetic objects for use in magnetic-based applications.

22. The apparatus of claim 21 wherein said magnetic object comprises an NdFeB-based magnet.

23. The apparatus of claim 21 wherein said BH curves of said magnetic object and said plurality of BH curves for said plurality of magnet volume elements are calculated in a magnetized spatial direction.

24. The apparatus of claim 21 wherein said BH curve of said magnetic object and said plurality of BH curves for said plurality of magnet volume elements are calculated in a non-magnetized spatial direction.

25. The apparatus of claim 21 wherein said magnetic object comprises an AlNiCo-based magnet.

26. The apparatus of claim 24 wherein said BH curves of said magnetic object and said plurality of BH curves for said plurality of magnet volume elements are calculated in a magnetized spatial direction.

27. The apparatus of claim 24 wherein said BH curve of said magnetic object and said plurality of BH curves for said plurality of magnet volume elements are calculated in a non-magnetized spatial direction.

* * * * *